April 19, 1932.  B. J. CHROMY  1,854,447
POLYPHASE MOTOR CONTROL SYSTEM
Filed May 14, 1930
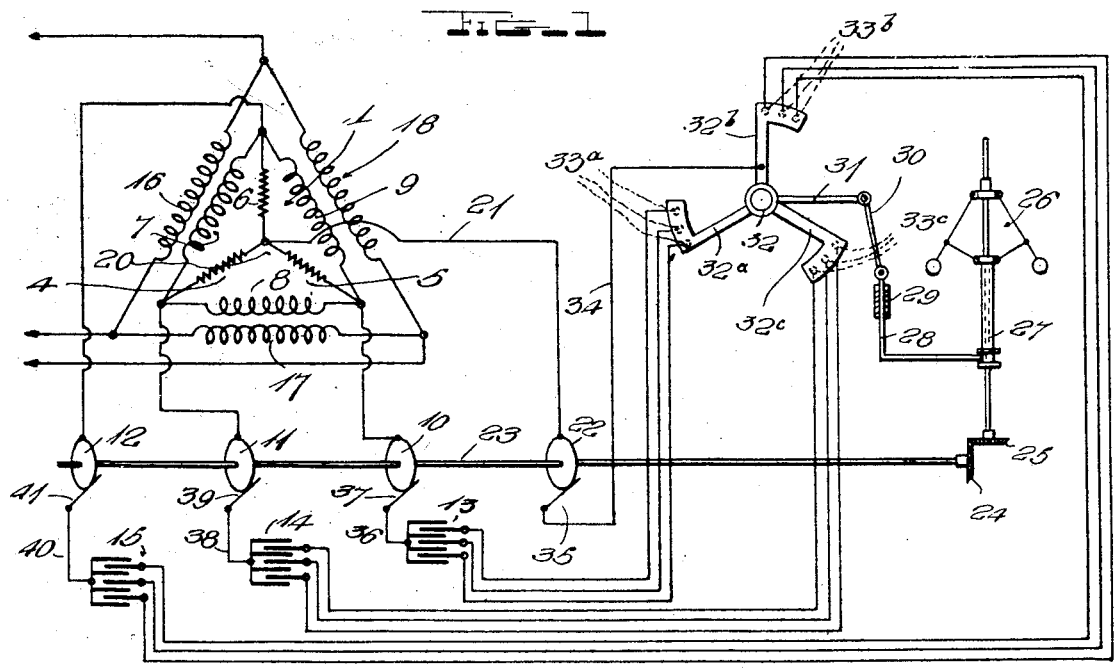
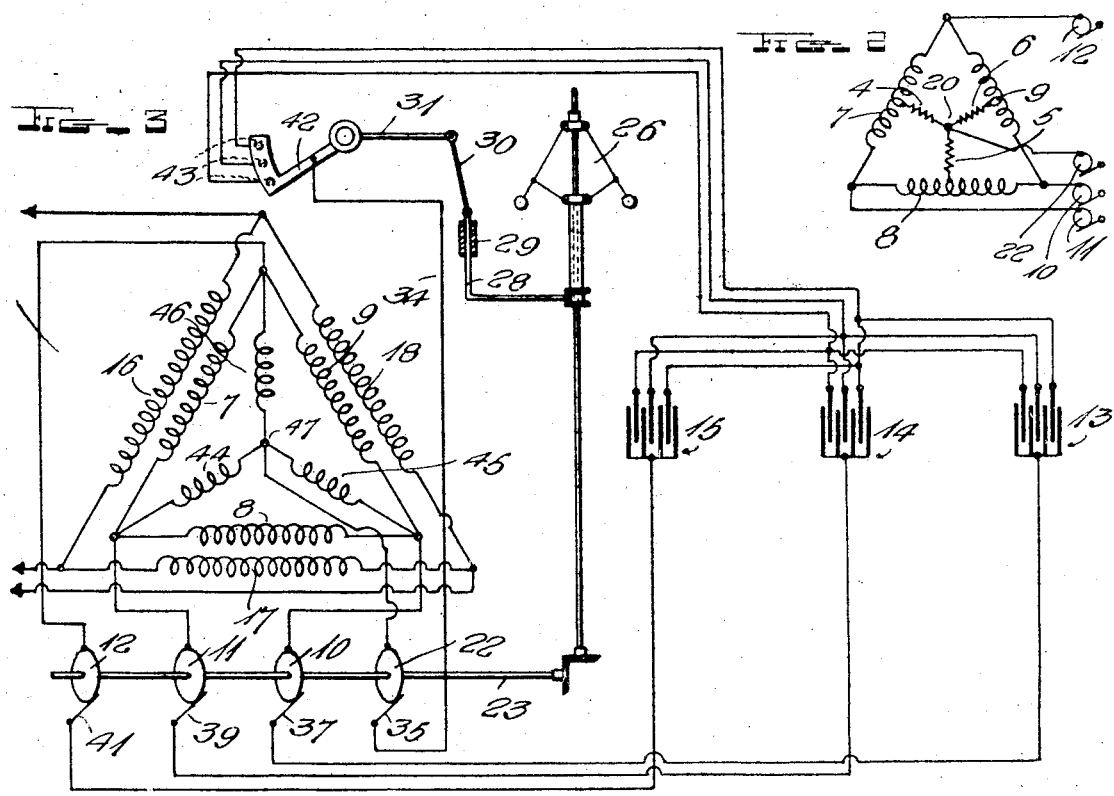
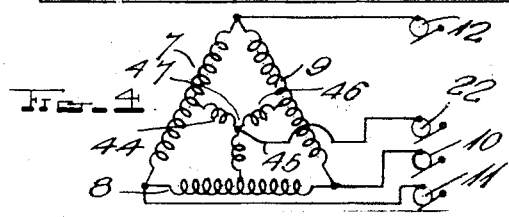
INVENTOR.
Ben J. Chromy,
BY John B. Brady
ATTORNEY.

Patented Apr. 19, 1932

1,854,447

UNITED STATES PATENT OFFICE

BEN J. CHROMY, OF HOPKINS, MINNESOTA, ASSIGNOR TO WIRED RADIO, INC., OF NEW YORK, N. Y., A CORPORATION OF DELAWARE

POLYPHASE MOTOR CONTROL SYSTEM

Application filed May 14, 1930. Serial No. 452,364.

My invention relates broadly to polyphase induction motors and more particularly to means for controlling the power factor in accordance with changes in load or variation in speed.

One of the objects of my invention is to provide a circuit arrangement for a polyphase induction motor system whereby the power factor may be controlled as the load or speed varies, a minimum number of leads being taken from the rotor winding through slip rings for accomplishing the control in the apparatus of my invention.

Another object of my invention is to provide a circuit arrangement for the windings of an induction motor whereby connections may be taken through a system of slip rings to an external condenser circuit, the effective capacity of the several condensers in the condenser circuit being controlled according to the speed of the apparatus and in accordance with variations in the load.

A further object of my invention is to provide a system of connections for a polyphase induction motor in which a phantom connection point is established with respect to points of different relative potentials in the rotor circuit for completing connections to an external condenser system, the capacities of which are selectively varied in shunt with the several phases of the motor system according to variations in speed or load.

Other and further objects of my invention reside in the circuit arrangement for a polyphase induction motor as set forth more fully in the specification hereinafter following by reference to the accompanying drawings, in which:

Figure 1 diagrammatically shows a polyphase induction motor system embodying the circuit arrangement of my invention; Fig. 2 is a fragmentary diagrammatic view showing a modified form of connection for establishing a phantom connecting point intermediate the several windings on the wound rotor of the polyphase motor; Fig. 3 shows a further modified form of polyphase induction motor circuit; and Fig. 4 is a fragmentary diagrammatic representation of a further modified form of connection for establishing a phantom point in the rotor for the connection of the external capacity circuits thereto.

Referring to the drawings in detail reference character 1 designates the wound rotor of a polyphase induction motor having windings 7, 8 and 9 connected in delta in three phase manner and having resistance units 4, 5 and 6 star connected between the common points of the windings 7, 8 and 9. The field windings for the polyphase motor are shown at 16, 17 and 18. The centers of the resistors 4, 5 and 6 are bonded as shown at 20 and a connection taken therefrom as represented at 21 to the slip ring 22 which is carried by the rotary shaft 23 of the polyphase motor. Shaft 23 also carries slip rings 10, 11 and 12 which connect respectively with the delta connected ends of the windings 7, 8 and 9 of the motor. The shaft 23 carries bevel gear 24 which meshes with bevel gear 25 for rotatively driving the centrifugal governor 26. The sleeve 27 on the centrifugal governor 26 controls the position of arm 28 which is adapted to be moved vertically in the guide sleeve 29. The link 30 is moved by arm 28 and serves to angularly shift the arm 31 for imparting corresponding angular movement to the switch system 32. The switch system 32 has arms 32a, 32b and 32c which are simultaneously shifted for opening the shunt connection across sets of contacts illustrated at 33a, 33b, and 33c. The sets of contacts 33a, 33b and 33c connect to taps in the condensers 13, 14 and 15. As the speed increases, the arms 32a, 32b and 32c are shifted counter-clockwise operating to disconnect the number of sections in condensers 13, 14 and 15 which are shunted by the overlapping relation of the contact arms with respect to the sets of contacts 33a, 33b and 33c, thus decreasing the condenser capacity. The switch system 32 is connected through lead 34 with brush 35 which establishes wiping contact with slip ring 22. The connection 36 extends from one side of condenser 13 to the brush 37 which establishes wiping contact with slip ring 10. The connection 38 leads from one side of condenser 14 to brush 39 which slidably engages the slip ring 11. The lead 40 extends from one side of condenser 15 and connects to brush 41 which is in sliding engagement with slip ring 12. In lieu of the phantom connection provided by the resistance elements 4, 5 and 6 on the rotor of the induction motor extending between the apex connections of the rotor windings 7, 8 and 9, I may provide a star connection and resistor elements from the mid-point of the rotor windings 7, 8 and 9 as illustrated in Fig. 2. In this arrangement the resistors 4, 5 and 6 connect to the mid-point of windings 7, 8 and 9 and the common bonded connection shown at 20 connects to the slip ring 22 in the manner illustrated in Fig. 1. The apex portions of the delta arranged rotor windings connect to slip rings 10, 11 and 12 as illustrated. A substantially better interbalancing of the phases is obtained by the connections illustrated in Fig. 2 when the optimum point in the winding for each phase is located for the connection of the resistor elements 4, 5 and 6 thereto.

Fig. 3 shows a modified circuit arrangement for the motor control system wherein inductances 44, 45 and 46 are star connected between the apex portions of the delta connected inductances 7, 8 and 9 which form the rotor windings. A set of slip rings similar to the slip rings described in Figs. 1 and 2 are connected to the polyphase motor windings in a manner similar to the arrangement heretofore described. The inductance elements 44, 45 and 46 are not rotor windings but are means arranged to obtain a point 47 of substantially zero voltage with respect to the several windings 7, 8 and 9 of the rotor. The centrifugal switch has been shown as including a single switch arm 42 movable over sets of contacts 43 which connect to the several sets of condenser plates of condensers 13, 14 and 15 in parallel. That is to say, instead of providing individual sets of contacts over which the switching system operates, I connect the sets of condenser plates in parallel and render effective successive sets of plates in each condenser in accordance with the movement of arm 42. Condensers 13, 14 and 15 have the sides of opposite potential thereof connected to the brushes 37, 39 and 41 bearing upon collector rings 10, 11 and 12.

In Fig. 4 I have shown a star connected inductance system including the elements 44, 45 and 46 connected to midpotential points along windings 7, 8 and 9. Connections are taken from the common point 47 to slip ring 22 and from the apex points of the Y connected system connections are taken to the slip rings 10, 11 and 12.

When inductance elements 44, 45 and 46 are employed, as illustrated in Fig. 3, in obtaining a phantom connected point with respect to the several windings of the rotor in lieu of the resistance elements, the inductances are made of a size substantially equal to the $$\sqrt{3}$$

times the inductance of each phase of the rotor (assuming that the inductance of each phase of the rotor is considered independent).

In the arrangement illustrated in Fig. 4 the value of the inductance in each leg of the star or Y connected circuit within the delta connection is less than the value of the inductance per phase of the rotor. The inductance of the rotor varies with speed in some degree. However, by properly interwinding the phantom windings with the main rotor windings, the ratio between the rotor phase inductance and the network within the rotor is preserved substantially constant. The centrifugal switch employed in the rotor control system operates with very small inertia and control of power factor by change in capacity in the circuits interconnecting the rotor windings is promptly effected. The position of the centrifugal switches shown in Fig. 1 is such as to include the maximum capacity of all of the condensers in circuit with the rotor windings. This is a condition where the rotor is at rest. As the rotor speeds up the capacity in circuit with the rotor winding is automatically reduced and in this way the power factor is maintained substantially constant. As the speed varies or as the load changes, the movement of the centrifugal system varies the effective capacity in circuit with the rotor windings. A minimum number of leads are taken from the rotor by reason of the arrangement of phantom circuit provided in the rotor. In induction motor systems, increases in load tend to decrease the speed of the motor and current passed through the motor windings develops the driving torque of the machine. This current tends to demagnetize, that is, to oppose the flux by which it is produced. The tendency of the reduction of the flux tends to cause the back E. M. F. to decrease and allow a larger current to flow in the primary or stator winding and in this way the stator current adjusts itself to suit the requirements of the secondary or rotor. The reduction in the value of the flux is relatively small so that at full load a magnetizing current is still required to produce the revolving field while a power component in phase with the required voltage is required for the load. The current normally lags the voltage applied to the stator by 90°. The power factor may be expressed as the ratio of the actual power to the apparent power as follows:

$$\text{Power factor} = \frac{\text{actual power}}{\text{apparent power}}$$

$$= \frac{EI \cos \alpha}{EI}$$

$$= \cos \alpha$$

The power factor of an induction motor is the value of cos α, that is, the angle between the voltage and current vectors.

As the load increases this angle tends to increase. This is due to the increase of the reactance of the stator and rotor windings which increases with the load and the current tends to lag behind the voltage. In the system of my invention the power factor is maintained constant for the reduction in capacity in proportion to increases in speed balances the inductive reactance which increases, thereby preventing the further lag of the current vector with respect to the voltage vector. The arrangement of the star connected impedances within the delta connected rotor windings is such that equalized distribution of current through the capacity and inductance of the several phases is obtained.

While I have described my invention in certain preferred embodiments I desire that it be understood that modifications may be made and that no limitations upon my invention are intended other than are imposed by the scope of the appended claims.

What I claim as new and desire to secure by Letters Patent of the United States is as follows:

1. In a polyphase motor, a delta connected rotor circuit, a condenser connected to each phase winding of the delta connected rotor circuit, a centrifugal switch governed by the speed of rotation of the rotor of said polyphase motor for varying the effective capacity of the condenser connected with each phase winding of the delta connected rotor and a Y connected impedance circuit having connections extending to said delta connected rotor circuit for equalizing the distribution of current from the individual condensers through the windings of the rotor.

2. A polyphase motor control system comprising a delta connected rotor circuit including windings individual to each phase of the rotor circuit, a condenser connected with each phase winding of the polyphase motor system, a centrifugal switch controlled by the movement of said rotor for controlling the effective values of the condensers in circuit with the separate phase windings of said rotor, and a star connected impedance circuit connected with said delta connected rotor circuit for completing connections between said condensers and each of the windings in the separate phases of said rotor circuit.

3. A polyphase motor control system comprising a rotor having delta connected windings, collector rings connected to each of said windings, a multiplicity of impedance elements connected in Y and connected to the several phase windings of said rotor, a collector ring connected with each of the windings in the delta connected rotor, an auxiliary collector ring connected to the common point in the star connected impedance circuit which connects with said rotor windings, a condenser connected to each of the collector rings in circuit with the several phase windings of said rotor circuit, a return circuit extending from the opposite sides of each of said condensers and said auxiliary collector ring, and centrifugal means for varying the effective value of the capacity of each of said condensers connected with each of the phase windings of said rotor.

4. A control system for polyphase motors comprising a polyphase wound rotor, collector rings connected to points in said wound rotor, a condenser connected with each of said collector rings, centrifugal means for varying the effective value of each of said condensers according to the speed of rotation of said rotor, and an impedance circuit for establishing connection between all of said condensers and points in said wound rotor whereby the capacity in circuit with each of said windings of the rotor may be selectively varied in accordance with the speed of said rotor.

5. A polyphase motor control circuit comprising a delta connected wound rotor, collector rings connected to each phase winding of said wound rotor, a Y connected impedance circuit connected with points in the circuit of said rotor, condensers connected with each of said collector rings, said condensers each being variable according to the speed of said rotor, circuits extending between said collector rings and each of said condensers, and a connection between a mid-point in said Y connected impedance circuit with said condensers whereby the capacity effective across each of the phase windings of said delta connected rotor may be selectively controlled.

6. A polyphase motor control system including a polyphase wound rotor having separate windings in each phase thereof, collector rings connected with each of the windings of said rotor, a Y connected impedance circuit connected to points in said polyphase wound rotor circuit, a collector ring connected to the neutral point of said Y connected impedance circuit, condensers in circuit with each of the collector rings connected to the windings of said polyphase motor, one side of each of said condensers being connected with a collector ring individual to each winding of said rotor circuit, and the opposite side of each of said condensers being connected with the neutral point in said Y connected impedance circuit, and means for selectively changing the effective value of the capacity of each of the condensers connected to the windings of said rotor according to the speed of said rotor.

7. A polyphase motor control circuit comprising in combination a polyphase rotor circuit including an inductance connected with each phase thereof, collector rings connected to each phase winding of said rotor circuit, independent condensers, connections between one side of each of said condensers and each of said collector rings, a Y connected impedance circuit having impedance elements connected with the mid-points of the phase windings in said rotor circuit, a connection between a neutral point in said Y connected impedance circuit and the other side of each of said condensers, and means in said connection for selectively controlling the effective values of each of the condensers connected to the phase windings of said rotor circuit and operative according to the speed of said rotor.

8. A polyphase motor control system comprising a rotor having a winding in each phase thereof, collector rings connected with each phase winding of said rotor, a multiplate condenser connected at one side to each of said collector rings, centrifugal means, a switch operative by said centrifugal means for selecting the effective number of plates of each of said condensers in circuit with said collector rings according to the speed of said rotor, and a Y connected impedance circuit having its neutral point connected in common with all of said condensers and other points therein connected with each of the phase windings of said rotor.

In testimony whereof I affix my signature.

BEN J. CHROMY.